Figure 1:
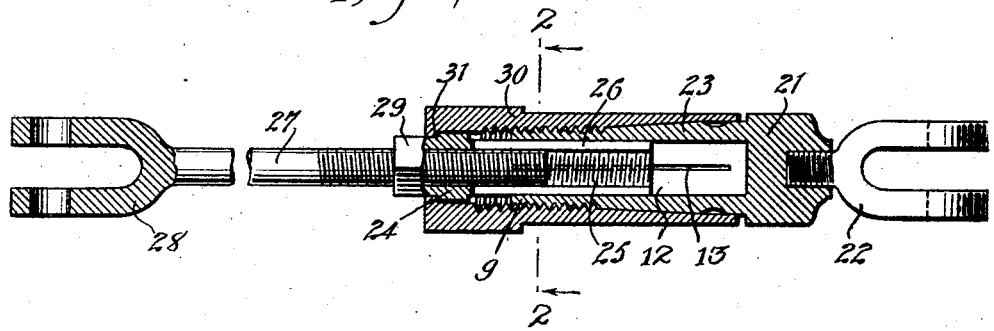

June 23, 1925.  1,543,633

H. J. VAN GELDER ET AL

NUT LOCK

Filed July 18, 1924

WITNESSES
Edw. Thorpe
E. L. Mueller

INVENTORS
Henry J. Van Gelder
John Ward
BY
Munn & Co
ATTORNEYS

Patented June 23, 1925.

1,543,633

UNITED STATES PATENT OFFICE.

HENRY J. VAN GELDER AND JOHN WARD, OF BROOKLYN, NEW YORK.

NUT LOCK.

Application filed July 18, 1924. Serial No. 726,814.

*To all whom it may concern:*

Be it known that we, HENRY J. VAN GELDER and JOHN WARD, citizens of the United States, and residents of the city of New York, borough of Brooklyn, in the county of Kings and State of New York, have invented a new and Improved Nut Lock, of which the following is a full, clear, and exact description.

This invention relates to improvements in nut locks, and has for one of its objects the provision of a nut lock of simple and inexpensive construction which will effectively prevent displacement of the nut from its adjusted positions, and in which the threads of the various parts will be protected against moisture and the accumulation of dirt and grit thereon.

The above and other objects will appear more clearly from the following detailed description, when taken in connection with the accompanying drawing, which illustrates preferred embodiments of the inventive idea.

In the drawing—

Figure 2:
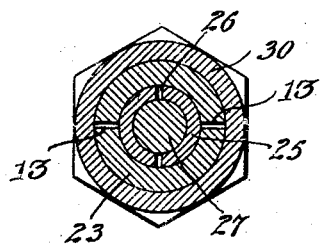

Figure 1 is a fragmentary longitudinal section of another form of the invention; and Figure 2 is a section on the line 2—2 of Figure 1.

The lock of the present invention is applicable to various uses, among which may be mentioned its adaptation as a part of the mechanism for adjusting brake rods and the like. It will be apparent, on reference to the drawing that the device of the present invention includes a member 21 on the head of which is an extension 23, which, at its outer end terminates in an externally screw-threaded portion 9. The member 21 including its extension 23 is formed with a longitudinal bore or opening 12. Preferably at diametrically opposite points the extension 23 is split longitudinally, as indicated at 13, throughout its entire length.

The device also includes an adjusting member 24 formed with a head from which extends an internally screw threaded sleeve 25 slotted longitudinally, as indicated at 26, and capable of being inserted into the bore 12 in said extension 23 of the member 21. The internal threads of the sleeve 25 are capable of receiving a threaded rod 27 which carries a clevis 28 at its outer end and with respect to which the member 24 is adjustable to vary the effective length of the rod 27. To permit of adjustment of the member 24 a portion 29 of the head thereof is extended beyond the adjacent end of the locking member 30, and formed to receive a wrench or other tool by means of which the member 24 may be rotated in either direction to accomplish the desired adjustment. When this is attained the member 30, which has previously been unscrewed slightly to disengage its tapered surface from the tapered surface of the extension 23, may then be screwed home to the position shown in the drawing whereupon the inturned flange 31 of the member 30 will engage the head of the member 24 and thereby secure the latter member in its adjusted position. By forming the sleeve 25 with slots the sections of said sleeve will be caused to tightly grip the threads of the rod 27 by reason of the pressure on the extension 23 when the locking member 30 is adjusted to its locking position shown in the drawing. Also the slotted formation of the sleeve 25, which permits of its being contracted into engagement with the threads of the rod 27, will overcome any variations in the diameter of the threads of said rod.

What is claimed is:

A device of the class described, including a longitudinally slotted member, a slotted adjusting member insertable into the first-named member and capable of being mounted upon a rod to vary the effective length of said rod, and a locking member engageable with said adjusting member and mounted upon the first-named member and operable to compress the slotted portion of said adjusting member into engagement with said rod through the intermediary of the slotted portion of said first-named member.

HENRY J. VAN GELDER.
JOHN WARD.